(12) United States Patent
Eigenmann et al.

(10) Patent No.: US 9,539,658 B2
(45) Date of Patent: Jan. 10, 2017

(54) REAMING TOOL AND METHOD FOR THE PRODUCTION THEREOF

(71) Applicant: KOMET GROUP GMBH, Besigheim (DE)

(72) Inventors: Roman Eigenmann, Ormalingen (CH); Erkan Hodza, Asperg (DE); Niklas Kramer, Bietigheim-Bissingen (DE); Henry Schütt, Sachsenheim (DE)

(73) Assignee: KOMET GROUP GMBH, Besigheim (DE)

( * ) Notice: Subject to any disclaimer, the term of this patent is extended or adjusted under 35 U.S.C. 154(b) by 58 days.

(21) Appl. No.: 14/345,556

(22) PCT Filed: Sep. 17, 2012

(86) PCT No.: PCT/EP2012/068227
§ 371 (c)(1),
(2) Date: Mar. 18, 2014

(87) PCT Pub. No.: WO2013/041478
PCT Pub. Date: Mar. 28, 2013

(65) Prior Publication Data
US 2014/0348606 A1    Nov. 27, 2014

(30) Foreign Application Priority Data

Sep. 19, 2011 (DE) .......................... 10 2011 082 979

(51) Int. Cl.
*B23D 77/02* (2006.01)
*B23P 15/46* (2006.01)
(Continued)

(52) U.S. Cl.
CPC ............... *B23D 77/02* (2013.01); *B23D 77/00* (2013.01); *B23P 15/46* (2013.01); *B24B 3/24* (2013.01);
(Continued)

(58) Field of Classification Search
CPC ........... Y10T 408/909; B23B 2200/081; B23D 77/02; B23D 77/025; B23D 77/00; B23D 77/04; B23D 2277/061; B23D 2277/26; B23D 2277/54; B23P 15/46
See application file for complete search history.

(56) References Cited

U.S. PATENT DOCUMENTS 3,226,797 A    1/1966  Hertel
4,215,957 A *  8/1980  Holma ................ B23B 27/1618
                                                 407/114
(Continued)

FOREIGN PATENT DOCUMENTS

CN    1043101 A    6/1990
CN    101143388 A  3/2008
(Continued)

OTHER PUBLICATIONS

DE102005005213_translation, obtained at http://worldwide.espacenet.com/ (last visited Sep. 28, 2015).*
(Continued)

*Primary Examiner* — Daniel Howell
*Assistant Examiner* — Ryan Rufo
(74) *Attorney, Agent, or Firm* — Flynn, Theil, Boutell & Tanis, P.C.

(57) ABSTRACT

A reaming tool, having a rotationally drivable main body (16) and at least one cutting body (18) fastened thereto. The at least one cutting body has at least one reaming blade (26) at the edge of a rake face (28). A chip-forming step (32) and/or chip-breaking elements (34) are formed in the rake face (28) and the reaming blade (26) has a ground cutting edge (40, 42, 44).

6 Claims, 2 Drawing Sheets

(51) Int. Cl.
*B23D 77/00* (2006.01)
*B24B 3/24* (2006.01)

(52) U.S. Cl.
CPC ...... *B23B 2200/081* (2013.01); *B23D 2277/04* (2013.01); *B23D 2277/26* (2013.01); *B23D 2277/54* (2013.01); *Y10T 408/909* (2015.01)

(56) References Cited

U.S. PATENT DOCUMENTS

| | | | | |
|---|---|---|---|---|
| 4,844,643 | A * | 7/1989 | Icks | 407/42 |
| 4,880,338 | A * | 11/1989 | Stashko | B23B 27/143 407/114 |
| 5,074,720 | A * | 12/1991 | Loqvist | B23C 5/202 407/114 |
| 5,181,810 | A | 1/1993 | Heule | |
| 5,217,333 | A * | 6/1993 | Hunt | 408/181 |
| 5,474,406 | A | 12/1995 | Kress et al. | |
| 5,494,383 | A | 2/1996 | Kress et al. | |
| 5,525,016 | A * | 6/1996 | Paya | B23B 27/141 407/116 |
| 5,660,507 | A * | 8/1997 | Paya | B23B 27/045 407/114 |
| 6,524,036 | B1 * | 2/2003 | Kolker | B23B 27/143 407/113 |
| 6,692,198 | B2 * | 2/2004 | Kress | 407/36 |
| 2001/0037609 | A1 | 11/2001 | Jensen et al. | |
| 2004/0213638 | A1 * | 10/2004 | Waggle, Jr. | B23C 5/207 407/113 |
| 2007/0196188 | A1 * | 8/2007 | Hecht et al. | 408/233 |
| 2010/0061815 | A1 * | 3/2010 | Inoue | B23B 27/007 407/100 |
| 2011/0070038 | A1 * | 3/2011 | Ishida | B23C 5/06 407/42 |
| 2011/0305534 | A1 * | 12/2011 | Park | B23B 27/141 407/100 |
| 2012/0070242 | A1 * | 3/2012 | Choi | B23C 5/109 407/113 |
| 2012/0087751 | A1 * | 4/2012 | Yamaguchi | 407/115 |
| 2012/0121352 | A1 * | 5/2012 | Ning et al. | 408/229 |
| 2012/0294682 | A1 * | 11/2012 | Park | 407/114 |

FOREIGN PATENT DOCUMENTS

| | | | | |
|---|---|---|---|---|
| DE | 1 281 779 A | 3/1963 | | |
| DE | 38 39 423 A1 | 5/1990 | | |
| DE | 43 20 511 A1 | 12/1994 | | |
| DE | 44 05 750 A1 | 8/1995 | | |
| DE | 197 12 377 A1 | 11/1997 | | |
| DE | 10 2005 005 213 A1 | 8/2006 | | |
| DE | 102005005213 A1 * | 8/2006 | | B23D 77/02 |
| DE | 10 2008 042 493 A1 | 4/2009 | | |
| JP | 2009061578 A | 3/2009 | | |
| JP | 2010179450 A | 8/2010 | | |
| WO | WO 2009/057087 A1 * | 5/2009 | | B23D 77/00 |

OTHER PUBLICATIONS

Drozda et al. (eds.), Tool and Manufacturing Engineers Handbook, 4th edition, vol. I (1983) at pp. 10-32 through 10-34.*
English Translation of International Preliminary Report on Patentability issued in International Application. No. PCT/EP2012/068227 (6 pages).
International Search Report for PCT/EP2012/068227 (3 pgs.).
German Search Report from Priority Application DE 10 2011 082 979.2 (5 pages).
Chinese Office Action issued in corresponding Chinese Patent Application No. 201280045619.3, dated May 15, 2015 (5 pgs.).

* cited by examiner

REAMING TOOL AND METHOD FOR THE PRODUCTION THEREOF

The invention relates to a reaming tool having a rotationally drivable or driven main body and at least one cutting body fixed to the main body, the cutting body having at least one reaming cutter on the edge of a rake face. The invention further relates to a method for producing reaming tools of this type.

Reaming is a material-removing machining process with a geometrically defined cutter, wherein, in contrast to drilling or boring, work is carried out only with small chip cross sections in always premachined bores. The machining allowances which are to be removed lie typically within the range 0.1 to 0.5 mm, with a feed of typically 0.05 to 0.3 mm. The requirements upon a reaming tool with respect to the machining of components are the production of a high dimensional accuracy and consistency over many components, the attainment of a high surface quality, the adherence to a precise geometric bore shape (for example cylinder, cone), and the achievement of a high level of economy as a result of an unimpeded machining process, since machine downtimes, for example for the disposal of unfavorably shaped chips which impede the overall process, impact extremely negatively on the component cost analysis.

In order to keep the dimensional accuracy of the bore within the range of just a few microns, reaming tools are individually tailored to the machining task. This accuracy can generally be achieved by exactly defined grinding of cutting bodies fixedly connected to the tool main body. The further tasks with respect to actual material removal and to the therewith associated chip formation are assigned substantially to the rake face, adjoining the cutting edge in the taper lead region.

In reaming tools of the type stated in the introduction, all functional surfaces are produced by cut-off machining methods, including the rake faces. This necessitates a geometric restriction of the possible shapes, which, in particular in the rake face region, has particular bearing, since effective chip breaking characteristics can barely be realized there. In this context, the geometry and possible traverses of the production tools used in relation to the cutting bodies premounted on the main body are limiting.

Starting herefrom, the object of the invention is to further improve the reaming tools known in the prior art, and methods for the production thereof, and to create an optimized chip formation, at the same time as high quality of the machining result.

For the achievement of this object, the combination of features defined in the independent patent claims is proposed. Advantageous embodiments and refinements of the invention emerge from the dependent claims.

The invention is based on the notion of producing the rake face topology and the reaming cutter by different shaping steps. Accordingly, it is proposed according to the invention that a chip-forming step and/or chip-breaking elements are formed as primary shaping elements in the rake face, and that the reaming cutter, at least in some sections, has a ground cutting edge. By primary shaping, the rake face, in particular in the taper lead region, with the formation of a chip-forming step or chip breakers, can advantageously be designed such that the chip formation proceeds in a controlled manner and the chips, which break as short as possible, are directed in the appropriate direction, where they can be safely transported away from the produced component surface. This is particularly important in reaming operations in steel, aluminum and stainless steel, as well as all further materials which tend toward plastic deformation and thus long-shaped chips. With the chip topographies which can be modeled by free forming, in conjunction with cutter geometries ground by material removal (land, multiland, radius, chamfer and radius, etc.), all requirements upon reaming cutters or reaming tools can thus be optimally fulfilled and significant improvements in the field of chip-forming control are achieved.

Advantageously, the cutting body is configured as a primary shaping part, in particular as a sintered pressed part, in order to obtain a broad geometric scope with respect to producible chip topographies.

In order to effectively influence the chip formation, shaping and fracture, it is an advantage if raised chip-breaking elements are arranged on the rake face, in particular in a taper lead region of the reaming cutter.

The chip-breaking elements can here have largely optional shapes of a geometric body, in particular, as an ellipsoid, sphere, barrel, cylinder, cube, prism, pyramid, cone, and frustums thereof.

A further improvement can be achieved by virtue of the fact that a plurality of chip-breaking elements are arranged in one or more rows, where necessary with, row by row, different heights along at least one portion of the reaming cutter, preferably parallel thereto.

Preferably, the chip-breaking elements are arranged at a lateral distance, preferably between 0 and 2 mm, to the reaming cutter.

By virtue of the inventive combination of shaping methods, it is also possible that the rake face has, at least in some sections, a positive rake angle, preferably in the range from 5° to 10°, that the reaming cutter and the chip-forming step have a mutually differing height level, and that the rake face has convex and/or concave and/or erratically running surface regions.

In method-related terms, the object stated in the introduction is achieved by virtue of the fact that a chip-forming step and/or chip-breaking elements are preformed as primary shaping elements on the rake face, and that subsequently the reaming cutter is formed at least in some sections by material removal, in particular grinding, lapping, polishing, erosion and laser cutting. The above-described advantages for the products of the method are thus achieved in the same way.

Advantageously, the reaming cutter is formed, in particular in a taper lead region, by finish-grinding of a flank or of a circularly ground chamfer of the cutting body preproduced by a primary shaping process.

In the course of the primary shaping, the cutting body can be provided, preferably by pressing, with a functional section for clamping, guidance or fastening to the main body.

A further advantageous embodiment provides that the preproduced cutting body is provided with a coating prior to application to the main body.

In an advantageous method variant, the cutting body is applied as a preform fixedly to the main body and then the reaming cutter on the tool is finish-ground.

Alternatively, it is also possible that the reaming cutter, if the cutting body is separate from the main body, is finish-ground. In this case, it is favorable if the cutting body is subsequently mounted on the main body such that it is adjustable in its orientation in an adjusting device.

BRIEF DESCRIPTION OF THE DRAWINGS

The invention is explained in greater detail below with reference to the illustrative embodiments represented schematically in the drawing, wherein.

DETAILED DESCRIPTION

Figure 1:
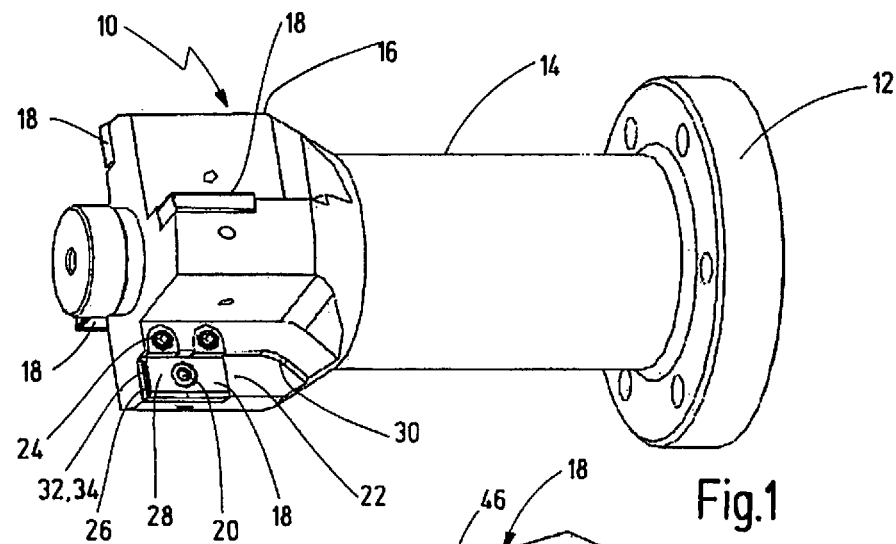
FIG. 1 shows a reaming tool having a main body and cutting bodies fixed thereto, in perspective representation.

The reaming tools represented in the drawing are intended as rotationally driven modular tools on machine tools for the after-machining of preproduced bores for the production of high-quality inner faces of cylindrical, conical or stepped shapes. For this purpose, the reaming tools 10 have a shank 14, which is detachably connectable to a machine spindle by a coupling 12 and is rotatable about its longitudinal axis, a main body 16, which is arranged at the front end of the shank 14, and a plurality of cutting bodies 18 fixed, peripherally distributed, on the main body 16.

In the embodiment shown in FIG. 1, the plate-shaped cutting bodies 18 are respectively fixed with a clamping screw 20, in a radially upright arrangement, in a plate seat 22 on the main body 16. On each plate seat 22 is additionally found an adjusting mechanism 24 for fine adjustment of the cutting bodies 18. The cutting bodies 18 can thus be oriented such that they protrude with their reaming cutter 26 in accordance with the bore shape and the machining allowance to be cut off—typically 0.1 to 0.5 mm—axially and/or radially over the main body 16. The rake face 28, adjoining the reaming cutter 26, of the cutting bodies 18 ensures that the chips generated in the reaming operation can be formed or broken in the desired manner and discharged via the chip spaces 30 in the main body 16. For this, a chip-forming step 32 having chip-breaking elements 34 is formed in the rake face 28.

Figure 2:
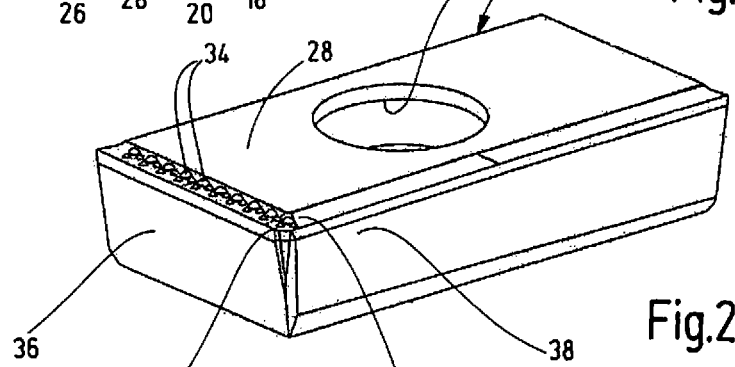
FIG. 2 shows a cutting body of the reaming tool in perspective representation.
Figure 3:
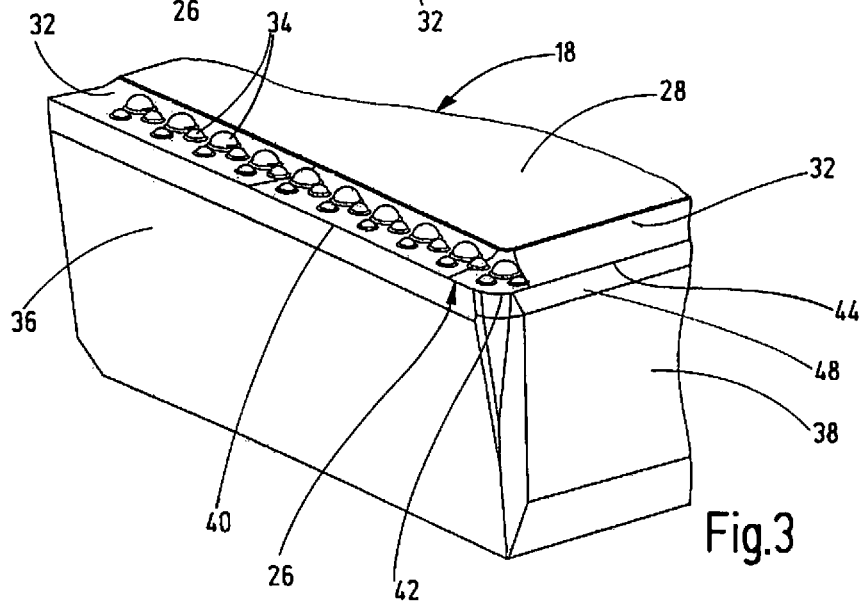
FIG. 3 shows an enlarged detail of FIG. 2 in the region of the reaming cutter of the reaming tool.

As can also be seen from FIGS. 2 and 3, the reaming cutter 26 ground on the laterally adjacent flanks 36, 38 has a front cutting edge 40, a taper lead 42, extending across a corner, and a secondary cutting edge 44. The taper lead 42 has the task of centering the reaming tool 10 optimally into the premachined bore and of reliably making a starting cut. In the region of the taper lead 42 and, where necessary, the front cutting edge 40, the actual metal cutting also takes place. The following secondary cutter 44 is substantially responsible for the secure guidance in the bore and the production of a good surface quality. The guidance and smoothing is here attributable to a very small axial slant of the secondary cutter 44 with a rearward diminishing cutting circle radius (typically 0 to 100 μm conicity over a 10 mm length). The guidance task can also be assumed by guide surfaces spatially divorced from the reaming cutter 26 and introduced into the main body 16 or the cutting bodies 18.

The chip-forming step 32 limited by the reaming cutter 26 is formed with a concave-profiled contour into the cutting body 18. In the region of the front cutting edge 40 and of the taper lead 42, chip-breaking elements 34, in the form of spherical caps, which are raised in the chip-forming step 32, are formed. These run in a plurality of rows, with a height which is different row by row, at a lateral distance to the reaming cutter 26. The distance here varies between 0 and about 2 mm. As a further functional section, an aperture 46 for the clamping screw 20 is configured in the center of the rake face 28.

In the shown embodiment, the clearance angle is defined by the grinding chamfer 48 on the reaming cutter 26. In the region of the taper lead 42, the chamfer 48 is ground with a radius. It is also conceivable to chamfer the taper lead 42 obliquely across a corner.

Figure 4:
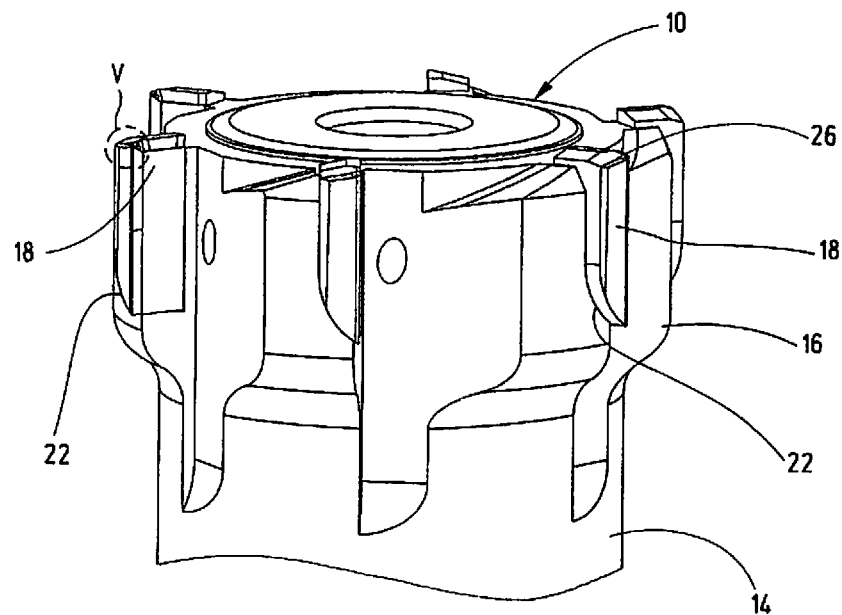
FIG. 4 shows a further illustrative embodiment of a reaming tool in interrupted perspective representation.

FIG. 4 shows a further embodiment of a modular reaming tool 10 with shank 14, main body 16, and cutting bodies 18 fixed to the latter. Here the cutting bodies 18 are fixedly soldered into the plate seats 22, so that the finish-grinding for the production of a reaming cutter 26 tailored to the desired bore geometry can be realized only once the cutting bodies 18 are in the installed state.

Figure 5:
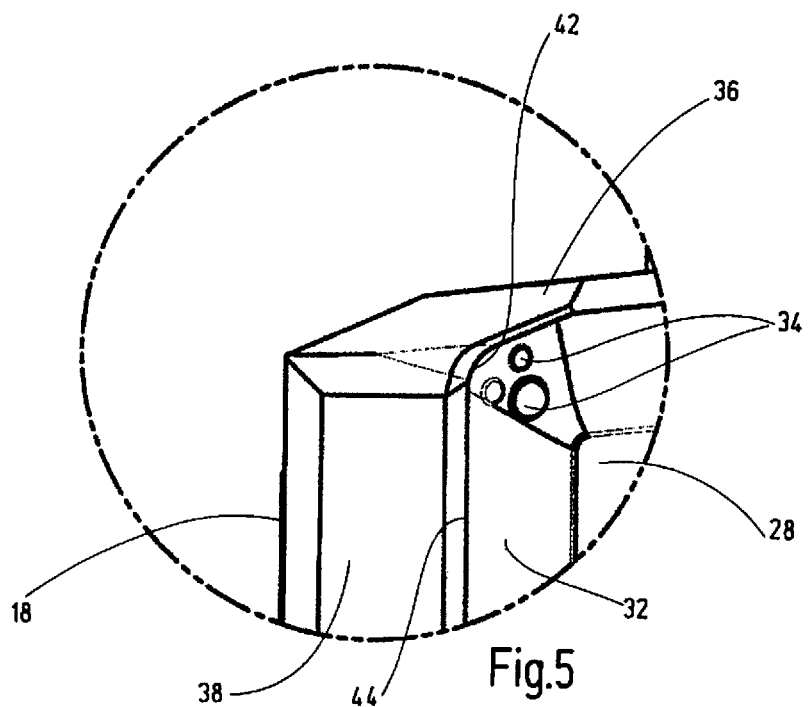
FIG. 5 shows an enlarged detail in the region V of FIG. 4.

FIG. 5 shows an enlarged detail of the taper lead region of the cutting bodies 18 in FIG. 4. Here, the same or similar parts are provided with the same reference symbols as in the previously described illustrative embodiment. Here only the taper lead 42 for the actual metal cutting is provided, so that the chip-breaking elements 34 for influencing the chip formation are also arranged only in the adjacent region of the chip-forming step 32.

For the production of the described reaming tools 10, the cutting bodies 18 are firstly produced as primary shaping parts by a primary shaping method. This produces a high freedom of design of the possible geometric shapes in comparison, for instance, to cut-off methods, which is of consequence, in particular, in rake face topography, because here, as a result of the chip-forming step 32 or chip-breaking elements 34, effective chip breaking characteristics can be realized. Particularly preferably, a powder-metallurgical production of blanks of the cutting bodies 18 is preferably effected by pressing and sintering. These blanks already have the final geometry in the region of the rake face 28, while, in the region of the reaming cutter 26 or of the flank clearance 36, 38, a machining allowance for a following grinding machining is provided.

In a first variant, for instance in the embodiment according to FIGS. 4 and 5, the blanks with pressed chip topography, where necessary after intermediate machining steps (pregrinding, coating) are non-detachably applied by soldering, gluing, etc, to the main body 16 attached to the shank 14. By way of preparation, the plate seats 22 on the main body 16 can be fine-machined in order that only a minor reworking of the cutting bodies 18 fixed thereon is necessary for the accurate geometrical adaptation and the topology is maintained in a state proximate to the master form.

Subsequently, in fixed orientation to the main body 16, the reaming cutter 26 is produced by exactly defined finish-grinding of the flanks 36, 38 or of the guide surfaces (circularly ground chamfers). Of importance here is, on the one hand, a highly precise adherence to the desired diameter and, on the other hand, extremely high surface quality of the ground faces, because both the jaggedness of the cutting edge and the friction conditions on the guide surfaces are thereby determined. This impacts directly on the quality of the machining result. Only a specific combination of taper lead geometry and guidance with matched conicity, paired with suitable cutting materials and, where necessary, coatings, guarantees the attainment of the required qualities.

In a further variant, the blanks of the cutting bodies 18 which are produced by powder metallurgy are finish-ground with chip topography separately from the main body 16. Subsequently the finished cutting bodies 16 are mounted on the main body 16, for instance by means of a clamping screw 20. An adjusting mechanism 24, which is adjustable in terms of diameter and conicity, is in this case necessary, as is shown, by way of example, in FIG. 1. This variant additionally gives rise, for example, to the following possibilities for a modularly joined reaming tool:

CVD coating (including diamond), which, in the field of joined tools, is otherwise ruled out because of the coating temperatures;

cutting elements made of non-solderable/poorly solderable/difficult to solder cutting materials (cermets, ceramic, CVD-diamond, etc.).

Generally, as a result of a pressed rake face topography in conjunction with a reaming cutter adapted by grinding, the following particular features can be realized on reaming tools:

positive rake angle along the complete cutting edge or taper lead geometry;

convex and concave shapes and geometry elements on the rake face;

shapes which are erratic in their course, such as steps, edges and depressions;

different height levels of cutting edge and chip-forming step (protuberances);

rake angle from 0° to 25° (preferably 5° to 10°);

cutting edge as high as, lower or higher than the upper cover face of the cutting body;

one or more rows of chip-breaking elements of different heights in successive rows or within a row (preferably in transverse end machining);

combination of mutually offset and non-offset rows of chip-breaking elements;

exact positioning of the chip-breaking elements relative to the chip flow direction;

defined angle of inlet and outlet of the chip-breaking elements relative to the rake angle;

defined distance of chip-breaking elements to the cutting edge (for instance within the range between 0 and 2 mm);

geometry, formed by pressing, for the clamping, guidance, fastening of the cutting bodies, such as, for example, clamping screw bore geometries, guides, toothings, clamping claw engagements;

contours for the conductance/diversion of cooling lubricants.

The invention claimed is:

1. A reaming cutter comprising a rotationally drivable main body and at least one cutting body fixed thereto and configured as a shaping part having a cutting edge adjoining a rake face having a concave profiled chip-forming step surface with raised chip-breaking elements formed thereon provided at a forward portion of the cutting body, wherein the cutting edge comprises a front cutting edge provided at the front of the cutting body, a taper lead cutting surface provided adjacent to a side of the concave profiled chip-forming step surface and a secondary cutting edge provided on a side of the cutting body and adjoining the taper lead cutting surface, the rake face having a positive rake angle in the range of 5-10° and the raised chip-breaking elements being provided solely on the concave profile chip-forming step surface and the taper lead cutting surface.

2. The reaming tool as claimed in claim 1, characterized in that the cutting body is a sintered pressed part.

3. The reaming tool as claimed in claim 1, characterized in that the chip-breaking elements have the shape of at least one of an ellipsoid, sphere, cylinder, cube, prism, pyramid, cone, and frustums thereof.

4. The reaming tool as claimed in claim 1, characterized in that a plurality of chip-breaking elements are arranged in rows having different heights and parallel to each other.

5. The reaming tool as claimed in claim 1, characterized in that the chip-breaking elements are arranged at a lateral distance of between 0 and 2 mm to the cutting edge.

6. The reaming tool as claimed in claim 1, characterized in that the rake face has convex and/or concave surface regions.

\* \* \* \* \*